United States Patent
Collins

(10) Patent No.: US 10,817,265 B2
(45) Date of Patent: Oct. 27, 2020

(54) CHATBOT DEVELOPMENT AND DEPLOYMENT PLATFORM

(71) Applicant: NATIONWIDE MUTUAL INSURANCE COMPANY, Columbus, OH (US)

(72) Inventor: Coty M. Collins, Columbus, OH (US)

(73) Assignee: NATIONWIDE MUTUAL INSURANCE COMPANY, Columbus, OH (US)

( * ) Notice: Subject to any disclaimer, the term of this patent is extended or adjusted under 35 U.S.C. 154(b) by 0 days.

(21) Appl. No.: 16/119,153

(22) Filed: Aug. 31, 2018

(65) Prior Publication Data

US 2019/0073197 A1   Mar. 7, 2019

Related U.S. Application Data

(60) Provisional application No. 62/553,362, filed on Sep. 1, 2017.

(51) Int. Cl.
| | |
|---|---|
| G06F 9/44 | (2018.01) |
| G06F 8/34 | (2018.01) |
| G06F 8/65 | (2018.01) |
| G06F 3/0481 | (2013.01) |
| G06F 3/16 | (2006.01) |
| H04L 12/58 | (2006.01) |

(Continued)

(52) U.S. Cl.
CPC .............. *G06F 8/34* (2013.01); *G06F 3/0481* (2013.01); *G06F 3/0486* (2013.01); *G06F 3/167* (2013.01); *G06F 8/60* (2013.01); *G06F 8/65* (2013.01); *H04L 51/02* (2013.01)

(58) Field of Classification Search
CPC ..... G06F 8/34; G06F 8/60; G06F 8/65; G06F 3/0481; G06F 3/0486; G06F 3/167; H04L 51/02
USPC ........................................................ 717/109
See application file for complete search history.

(56) References Cited

U.S. PATENT DOCUMENTS

| | | | | |
|---|---|---|---|---|
| 7,263,526 | B1 * | 8/2007 | Busey | .................. H04L 12/1813 |
| 10,187,337 | B2 * | 1/2019 | Smullen | ................ H04L 67/322 |

(Continued)

OTHER PUBLICATIONS

Title: A conversational user interface for software visualization, author: S Bieliauskas et al, published on 2017.*

(Continued)

*Primary Examiner* — Chameli Das
(74) *Attorney, Agent, or Firm* — Thomas E. Lees, LLC

(57) ABSTRACT

A process for developing a chatbot object file includes generating an object file that includes platform agnostic logic and is free of platform specific executable code. The object file is generated from a chatbot flow that is created by a developer through a drag-and-drop interface by linking the user-created chatbot flow to at least one library of common chatbot code elements. Further, a process for deploying a chatbot comprises executing a platform that maps agnostic logic to specific commands of the platform and receiving an object file for a chatbot, where the object file includes logic agnostic to the platform. Further, the process comprises initializing a chatbot instance on the platform based on the received object file and the platform by mapping the agnostic logic of the object file to the specific commands of the platform and associating an interface to a user interface associated with the chatbot instance.

27 Claims, 7 Drawing Sheets

(51) Int. Cl.
    *G06F 3/0486*     (2013.01)
    *G06F 8/60*     (2018.01)

(56) References Cited

U.S. PATENT DOCUMENTS

| | | | |
|---|---|---|---|
| 2016/0099963 A1* | 4/2016 | Mahaffey | H04L 63/145 |
| | | | 726/25 |
| 2016/0299954 A1* | 10/2016 | Bawri | H04L 12/1831 |
| 2017/0324868 A1* | 11/2017 | Tamblyn | H04M 3/5191 |
| 2018/0107461 A1* | 4/2018 | Balasubramanian | G06F 8/35 |
| 2018/0123987 A1* | 5/2018 | Brody | H04L 51/04 |

OTHER PUBLICATIONS

Title: Building a chatbot with serverless computing, author: M Yan et al, published on 2016.*
Title: Programming challenges of chatbot: Current and future prospective; author: AM Rahman et al, published on 2017.*

* cited by examiner

CHATBOT DEVELOPMENT AND DEPLOYMENT PLATFORM

CROSS REFERENCE TO RELATED APPLICATIONS

This application claims the benefit of U.S. Provisional Patent Application Ser. No. 62/553,362, filed Sep. 1, 2017, entitled "CHATBOT DEVELOPMENT AND DEPLOYMENT PLATFORM", the disclosure of which is hereby incorporated by reference.

BACKGROUND

Various aspects of the present invention relate generally to chatbots, and specifically to the technological field of development and deployment of generic chatbots.

A chatbot is an application that responds to a user's messages according to predetermined logic. Basically, a user sends a message to the chatbot through some sort of messaging application (e.g., typing in a message window, speaking into a voice system that translates the voice to text, etc.). In response, the chatbot decodes certain words to determine a response to send back to the user. Simple chatbots decode words directly from the message, while more complex chatbots determine an intent from the message and respond accordingly. Some chatbots couple to a third-party backend to augment responses to the user.

BRIEF SUMMARY

According to aspects of the present invention, a computer-implemented process for developing a chatbot comprises launching a graphical user interface (GUI) implementing a drag-and-drop work environment for building chatbots and creating a chatbot flow within the graphical user interface. To create the chatbot flow, a developer interacts with the GUI to generate an initial node that defines a starting point in a conversation between an initiator and a corresponding chatbot. Further, the developer interacts with the GUI to generate a chat node that links to the initial node. The chat node defines logic for processing a request from the initiator and for generating a response to the request based upon a topic associated with the chatbot flow. The process further comprises interacting with the GUI to generate a chatbot object file from the chatbot flow, wherein the chatbot object file is generated by linking the user-created chatbot flow to at least one library of common chatbot code elements. Further, the chatbot object file includes platform agnostic logic and is free of a platform specific executable code.

According to further aspects of the present disclosure, a process for deploying a chatbot comprises executing a platform that maps agnostic logic to specific commands of the platform and receiving an object file for a chatbot, where the object file includes logic agnostic to the platform. Further, the process comprises initializing a chatbot instance on the platform based on the received object file and the platform by mapping the agnostic logic of the object file to the specific commands of the platform and associating an interface to a user interface associated with the chatbot instance.

DETAILED DESCRIPTION

Aspects of the present disclosure are directed toward development of a chatbot object file for later deployment as a chatbot instance on a platform. A graphical user interface (GUI) is provided that enables a chatbot developer (i.e., user) to develop a chatbot object via a drag-and-drop utility by generating a chatbot flow. The chatbot flow includes nodes that include underlying code that determines the functionality of each node. Further, the chatbot object file created from the chatbot flow includes platform agnostic logic by not including any platform-specific executable code. A deployment platform then maps agnostic logic to platform-specific commands (i.e., executable code).

When creating a chatbot object for later deployment, a chatbot developer must define how the chatbot will respond to conversation queries, which requires the chatbot developer to write code defining an overall flow and code for each portion of a conversation between a user and the chatbot. With complex chatbots, the overall code may become cumbersome. According to aspects of the present disclosure, the drag-and-drop nature of the development system overcomes the cumbersome code by enabling the chatbot developer to create the chatbot flow only writing a limited amount of code for decision logic of the nodes. Thus, using the processes described herein, up to a 90% reduction in written code may be realized.

Further, according to aspects of the present disclosure, a library of reusable interfaces, definitions, and nodes is available to a chatbot developer when developing a chatbot flow. Thus, the chatbot developer does not need to have as much expertise, because most of the flow is created through the environment as opposed to written code.

Further, most chatbot object files are platform/framework-specific (e.g., Microsoft Bot Framework). Microsoft is a registered trademark owned by Microsoft Corporation of One Microsoft Way, Seattle, Wash. 98104. Thus, a chatbot object file may be deployed to one specific deployment platform. Thus, if the same chatbot were to be instantiated on three different deployment platforms, then three different chatbot object files must be maintained. However, according to aspects of the present disclosure, the chatbot object file created is platform agnostic and is free from platform-specific executable code and logic. Thus, any deployment platform may be used, if the deployment platform can map the agnostic logic to platform-specific commands. As such, a deployment platform is provided that maps the agnostic logic of the object file to the specific commands of the platform.

Moreover, the present disclosure is directed toward improvements in the technological fields of chatbot development and deployment.

Networking Overview

Figure 1:
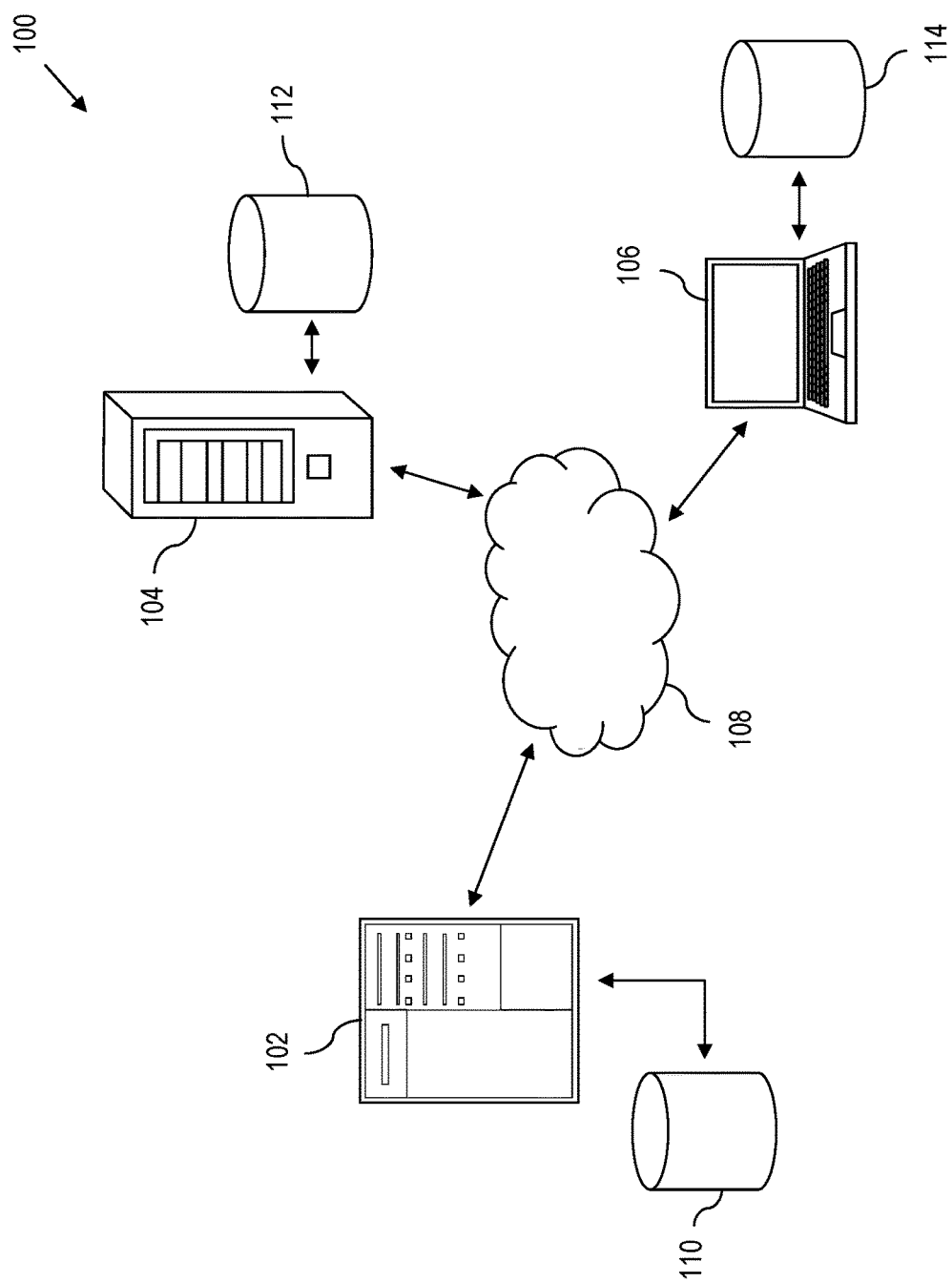
FIG. 1 is a diagram illustrating a networking system, according to various aspects of the present disclosure.

Referring to the drawings and in particular FIG. 1, a network system 100 is illustrated according to aspects of the present disclosure herein. Generally, a processing device designated as a first machine 102 communicates with one or more remote processing devices, e.g., a second machine 104 and a third machine 106, across a network 108. The second machine 104 and third machine 106 are illustrated solely for purposes of simplified explanation. In practice, one or more remote devices may communicate with the first machine 102. The first machine 102 may comprise a mainframe computer, server computer, or other processing device that is capable of responding to data transfer requests, as will be described in greater detail herein. In this regard, the first machine 102 has access to storage 110, e.g., any form of storage, including disk(s), network addressed storage (NAS), file server(s), a cloud-based storage or other structure where data can be retrieved.

The second machine 104 and third machine 106 may each comprise any processing device that is capable of communicating over the network 108 to request and/or receive data from the first machine 102. For instance, typical processing devices include server computers, personal computers, notebook computers, and tablets. The second machine 104 or third machine 106 may also comprise by way of example, transactional systems, purpose-driven appliances, cellular devices including smart telephones, and special purpose computing devices.

For purposes of discussion herein, the second machine 104 has access to storage 112 where data received from the first machine 102 is to be stored. Likewise, the third machine 106 has access to storage 114 where data received from the first machine 102 is to be stored.

The network 108 provides communication links between the various processing devices, e.g., the first machine 102, the second machine 104, and the third machine 106. Accordingly, the network 108 may be supported by networking components such as routers, switches, hubs, firewalls, network interfaces, wired or wireless communication links and corresponding interconnections, cellular stations and corresponding cellular conversion technologies, e.g., to convert between cellular and TCP/IP, etc. Such devices are not shown for purposes of clarity. Moreover, the network 108 may comprise connections using one or more intranets, extranets, local area networks (LAN), wide area networks (WAN), wireless networks (WIFI), the Internet, including the world wide web, a cloud, and/or other arrangements for enabling communication between the processing devices, in either real time or otherwise, e.g., via time shifting, batch processing, etc.

The network system 100 is shown by way of illustration, and not by way of limitation, as a computing environment in which various aspects of the present disclosure may be practiced. Other configurations may alternatively be implemented. All of the devices discussed above in reference to the network (e.g., machines, routers, switches, hubs, etc.) are entities within the network.

Chatbot System Overview

Figure 2:
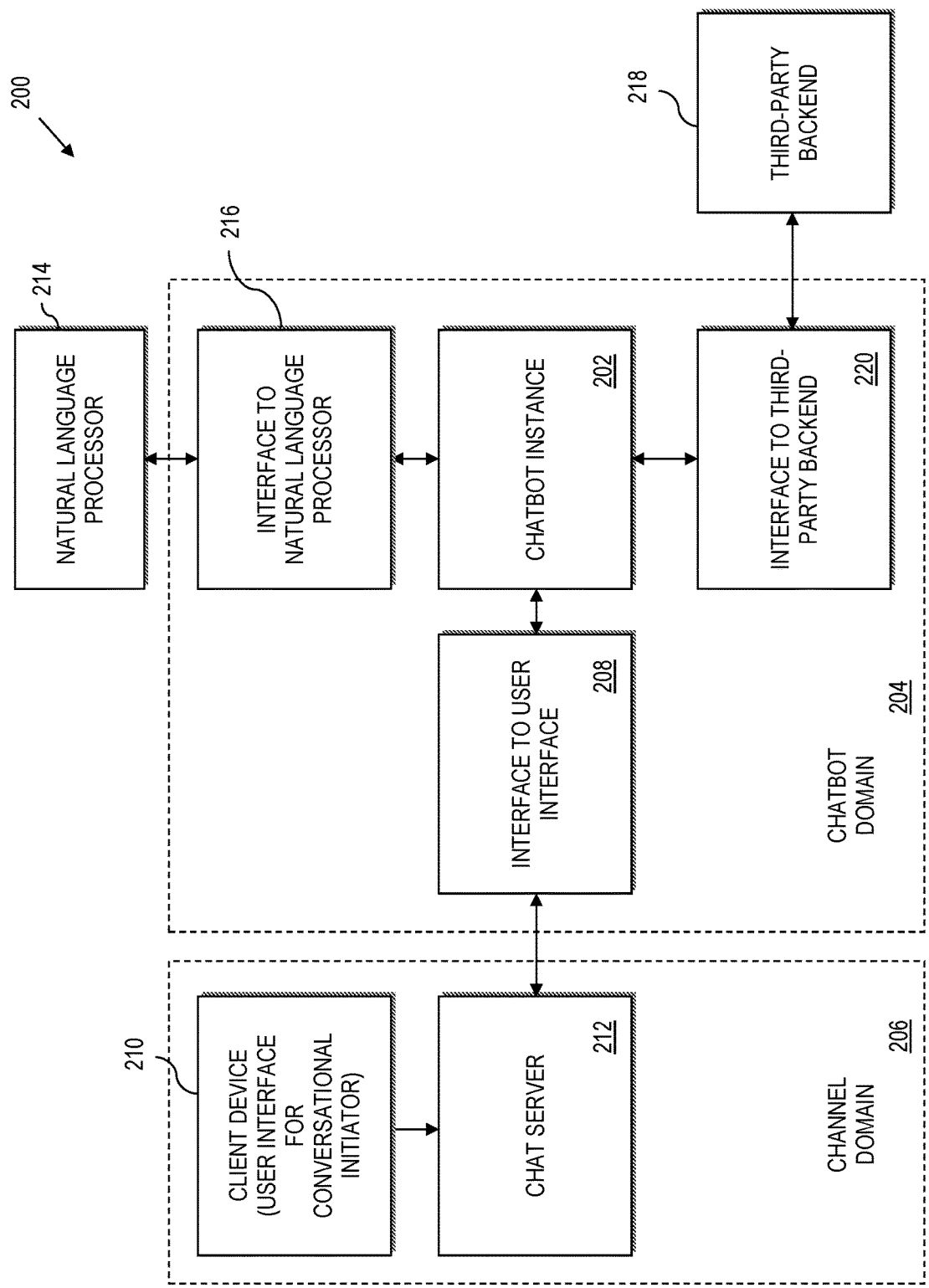
FIG. 2 is a block diagram illustrating a chatbot instance deployment platform and framework, according to aspects of the present disclosure.

FIG. 2 is a block diagram of a system 200 illustrating a chatbot instance 202 in use in a chatbot domain 204. Basically, the chatbot instance 202, which is created from a chatbot object file, interfaces to a channel domain 206 through an interface to the channel domain (i.e., a user interface) 208. Basically, a user may initiate a conversation with a chatbot instance 202 via a client device 210 of the channel domain 206 that interacts with the chatbot domain 204 through a chat server 212. For example, a user can use a messaging service (e.g., Windows Messenger, Skype, webchat, etc.) to initiate a conversation with a chatbot instance 202 running on a platform of the chatbot domain 204. Thus, any conversation with the chatbot goes through the chat server 212 associated with the messenger service. Skype is a registered trademark of Skype Technologies S.A. Corporation of Luxembourg, 15821 Ventura Blvd., Suite 525 Encino, Calif. 91436.

The chatbot instance 202 is also coupled to a natural language processor 214 (e.g., LUIS (Language Understanding Intelligent Service) by Microsoft) via an interface 216 to the natural language processor. Thus, when the user (i.e., the conversation initiator) sends a message to the chatbot instance 202, the message may be sent to the natural language processor 214 to determine an intent of the message. In some embodiments, the intent of the message is determined directly by custom logic on the chatbot instance 202, and in other embodiments the intent of the message may be determined by both custom logic on the chatbot instance 202 augmented by an external natural language processor 214. The chatbot instance uses the intent of the message to respond to the message using logic on the chatbot instance 202 (determined by a chatbot flow described in greater detail below).

Further, the chatbot instance 202 may be coupled to a third-party backend 218 through an interface 220 to the third-party backend 218. The third-party backend 218 may be any device or group of devices that supplies information or logic for the chatbot instance 202 to use when responding to the user. For example, if the chatbot instance 202 is to help a user determine which tablet computer to purchase from a store, then the third-party backend may be a database (or several databases) that include specifications for various tablet computers from one or more manufacturers. As another example, if the chatbot instance 202 is to help a user connect to a printer in an office building, then the third-party backend may be a list of printers available and logic to connect to a selected printer (or multiple printers). Therefore, the chatbot instance 202 may be used to aid a user in any aspect.

The chatbots described herein are developed on a platform and then deployed on a platform/framework that may be the same platform as the development platform or different from the development platform.

Chatbot Development

Figure 3:
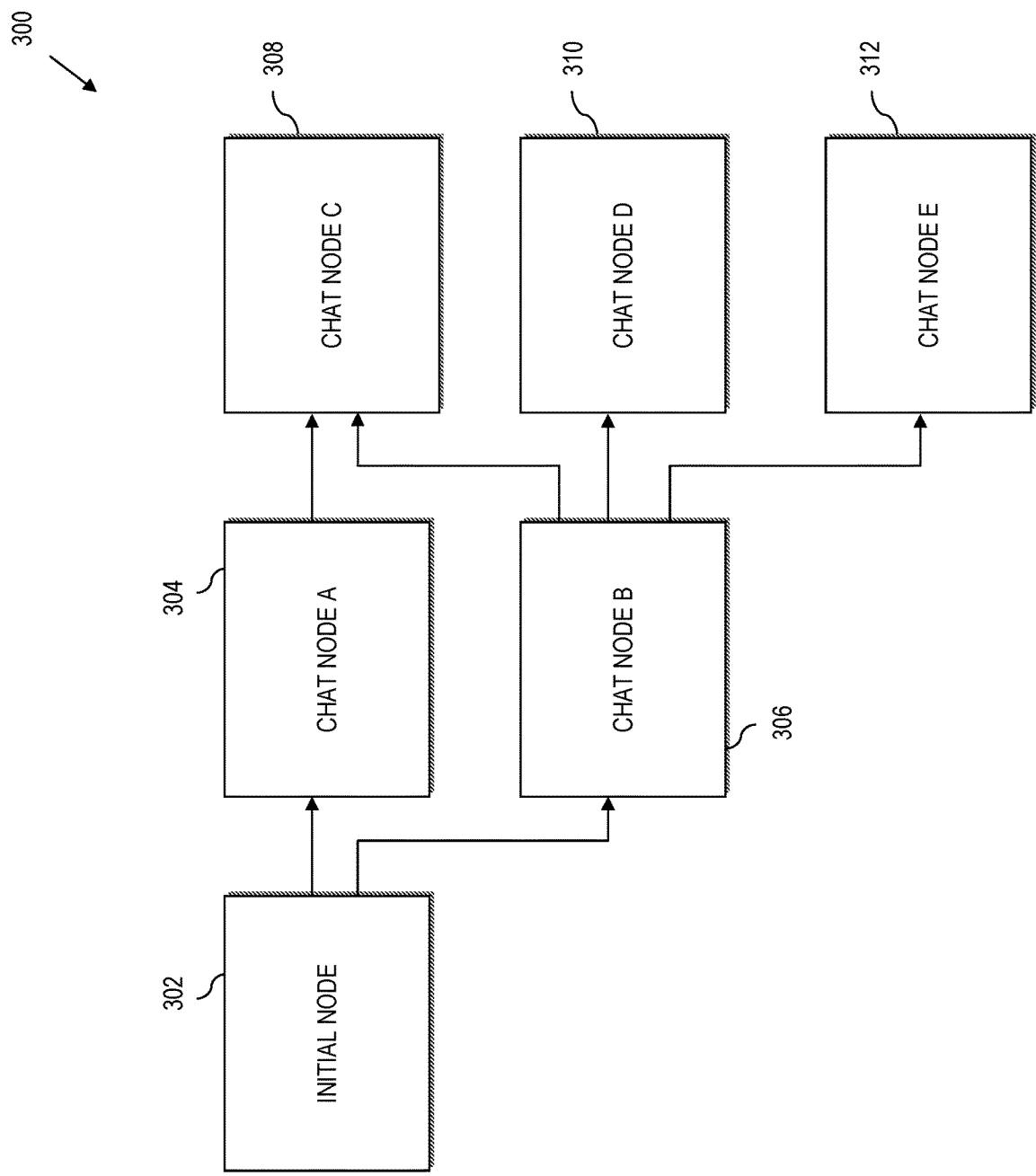
FIG. 3 is a block diagram illustrating an example chatbot flow, according to aspects of the present disclosure.

FIG. 3 illustrates an example chatbot flow 300 that may be created by a chatbot developer using a graphical user interface (GUI) of a chatbot drag-and-drop development tool, as described herein. The chatbot developer chooses a node and adds the node to the chatbot flow as an initial node 302, which will be the logic that executes when a user initiates a conversation with a chatbot instance associated with the chatbot flow. The chatbot developer may define several different aspects of the initial node. For example, the chatbot developer may indicate a number of outputs for the initial node by choosing a number of outputs or some other method. In the example chatbot flow 300, the initial node 302 has two outputs.

Further, the chatbot developer may add additional nodes (denoted as chat node A-E 304, 306, 308, 310, 312) and provide a number of outputs (and inputs) for the individual chat nodes 304-312. For example, chat node C 308 includes two inputs; thus there are two different ways that the flow 300 can progress to chat node C 308 (through chat node A 304 or chat node B 306). Note that the initial node 302 is a specific type of chat node. Additionally, the chatbot developer may draw connection lines that connect output(s) of chat nodes to inputs of chat nodes to define a sequence between the chat nodes of the chatbot flow.

Moreover, the chatbot developer assigns (or writes) code that indicates logic for the chatbot to follow for each chat node. For example, in chat node B 306, there are three outputs, so there will be three possible ways to exit chat node B 306. As such, the chatbot developer may write code that instructs the chatbot to use the first output of chat node B 306 if an intent of a message from the user is to inquire about maternity leave. However, if the intent of the message is to inquire about medical insurance regarding maternity matters, then the second output of chat node B 306 may be used. Finally, if the intent of the message is to set an appointment with an on-site nurse, then the third output of chat node B 306 may be used. Thus, depending on the intent of the message, different outputs of a chat node may be used to exit a specific chat node (the initial node is a type of chat node).

Further, the chatbot drag-and-drop development tool, as described herein, includes a detail specification that allows the chatbot developer to define actions to be performed upon entering the initial node 302 and/or a chat node 304-312, before logic associated with the initial/chat node 302-312 is executed. For example, upon entering the initial node 302, but before any logic is executed for that initial node, a text message may be sent to the user to let the user know that the user is communicating with a specific chatbot. As another example, upon entering a chat node, a message may be sent asking the user for credentials (e.g., user identification and password).

Similar to the detail specification that allows the chatbot developer to define actions to be performed upon entering a node, another detail specification is available that allows the chatbot developer to define actions to be performed when exiting the chat node, after the logic associated with the chat node is executed.

Thus, using the graphical user interface (GUI) of the chatbot drag-and-drop development tool, a chatbot developer can create a chatbot flow by entering chat nodes and connecting the chat nodes together via the inputs and outputs of the chat nodes. Further, the chatbot developer can provide logic (i.e., code, script) that is executed depending on an intent of a message. Moreover, the chatbot developer may define actions that take place before the logic associated with the chat node is executed, after the logic associated with the chat node is executed, or both. During chatbot development, the chatbot developer may also use the chatbot drag-and-drop development tool as a debugger.

Once the chatbot flow is to the chatbot developer's liking, then a chatbot object file is created for deployment. The chatbot object file may be in any desired format (e.g., JSON (JavaScript Object Notation), other open-standard file formats). JavaScript is a registered trademark of Sun Microsystems, Inc. a Delaware corporation, located at 4150 Network Circle Santa Clara Calif. 95054.

When creating the chatbot object file, the chatbot flow is linked to a library of common chatbot code elements that are platform agnostic. Therefore, the chatbot object file includes logic that is agnostic to any deployment platform (e.g., Microsoft Bot Framework). Thus, when being deployed, an application that runs on top of the platform may instantiate the chatbot on the platform by mapping the platform-agnostic logic to platform-specific commands on the platform, which is discussed in greater detail below. For example, when being deployed on a Microsoft Bot Framework, the application will map the common chatbot code elements of the chatbot object file to specific commands of the Microsoft Bot Framework.

Using the development tool as described herein, a chatbot developer may take a top-down approach to developing chatbot object files that may be deployed on any platform. The amount of coding required is cut drastically (up to 90% in some cases), as the overall flow and many events are included through the GUI and chatbot flow. Only the decision logic of what each chat node does in reference to the intent of the received message needs to be scripted (i.e., written in code). The rest of the performance of the chatbot functionality is handled through options of the GUI drag-and-drop work environment.

In some embodiments, chatbot templates are available for the chatbot developer to use as starting point for a chatbot flow.

Figure 4:
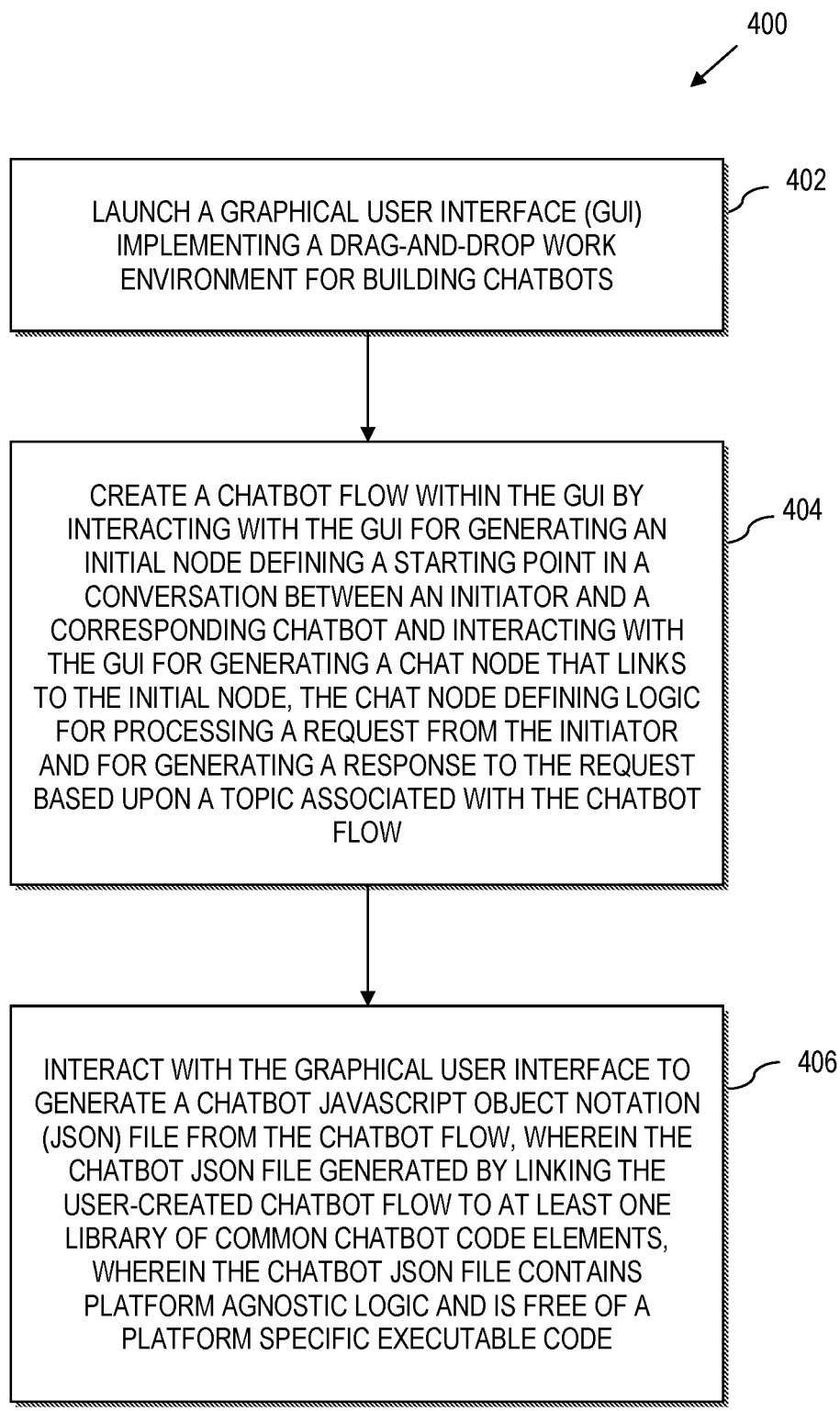
FIG. 4 is a flow chart illustrating a process for developing a chatbot object file that is platform/framework agnostic, according to aspects of the present disclosure.

FIG. 4 illustrates a process 400 for developing a chatbot object file, according to aspects of the present disclosure. At 402, a GUI implementing a drag-and-drop work environment for building chatbot objects is launched. For example, the drag-and-drop work environment that enables a chatbot developer to place chat nodes, connect chat nodes, implement logic, and implement commands before and/or after the logic described above may be used as the work environment.

At 404, a chatbot flow is created within the GUI. A chat node is placed within a work area of the GUI and designated as an initial node. The initial node is the chat node that will be implemented when a user first initiates a conversation with the chatbot instantiated from the chatbot object. Further, an additional chat node that links to the initial node is placed in the work area of the GUI. The additional chat node defines logic for processing a request from the user (i.e., the conversation initiator) and generating a response to the request based upon a topic associated with the chatbot flow. For example, the topic may be maternity questions for a human resources chatbot. As another example, the topic may be setting up a printer within a building and associating the printer with various computing devices. Thus, the flow is received by the work environment.

At 406, the work environment generates a chatbot object file (e.g., a JSON object file) from the chatbot flow by linking the user-created chatbot flow to at least one library of common chatbot code elements. Thus, the chatbot object file includes platform-agnostic logic and is free from platform-specific executable code. Therefore, chatbot instances created from the chatbot object file can be instantiated on any desired deployment platform if there is a mapping between the platform-agnostic logic and the platform-specific executable commands. For example, an application on the deployment platform may read the chatbot object file to identify the platform agnostic logic of the chatbot and then translate the chatbot object file to a platform dependent chatbot instance associated with the platform by linking the platform agnostic logic to platform-specific logic (e.g., node packages) of the selected platform.

A sample output from the work environment is shown below:

```
{
    "title": "Hello World Bot",
    "prompt": "I am the hello world bot! What would you like me to do?",
    "speakSlow": true,
    "botProfileId": 2,
```

-continued

```
"flows": [
{
    "id": 33,
    "title": "MainFlow",
    "isActive": true,
    "botId": 2,
    "nodeLinks": [
    {
        "id": 1708,
        "fromConnector": "out",
        "toConnector": "in",
        "flowId": 33,
        "fromOperatorId": 1593,
        "toOperatorId": 1595
    },
    {
        "id": 1709,
        "fromConnector": "out",
        "toConnector": "in",
        "flowId": 33,
        "fromOperatorId": 1594,
        "toOperatorId": 1595
    }],
    "nodes": [
    {
        "id": 1593,
        "type": "intent",
        "format": "intent",
        "intentTitle": "Say Hello",
        "onBeforeEnabled": false,
        "onBeforeText": "",
        "onAfterEnabled": true,
        "onAfterText": "send('Hello World!');\ndone( );",
        "flowId": 33
    },
    {
        "id": 1594,
        "type": "intent",
        "format": "intent",
        "intentTitle": "Say Goodbye",
        "onBeforeEnabled": false,
        "onBeforeText": "",
        "onAfterEnabled": true,
        "onAfterText": "send('Goodbye!');\ndone( );",
        "flowId": 33
    },
    {
        "id": 1595,
        "prompt": "Was that fun?",
        "type": "input",
        "format": "choiceConfirm",
        "onBeforeEnabled": false,
        "onBeforeText": "",
        "onAfterEnabled": true,
        "onAfterText": "if(getResponse( )) {\n    send('Great!');\n}
        else
            {\n    send('That is too bad.');\n}\ndone( );",
        "flowId": 33
    }]
}]
}
```

Chatbot Deployment

Figure 5:
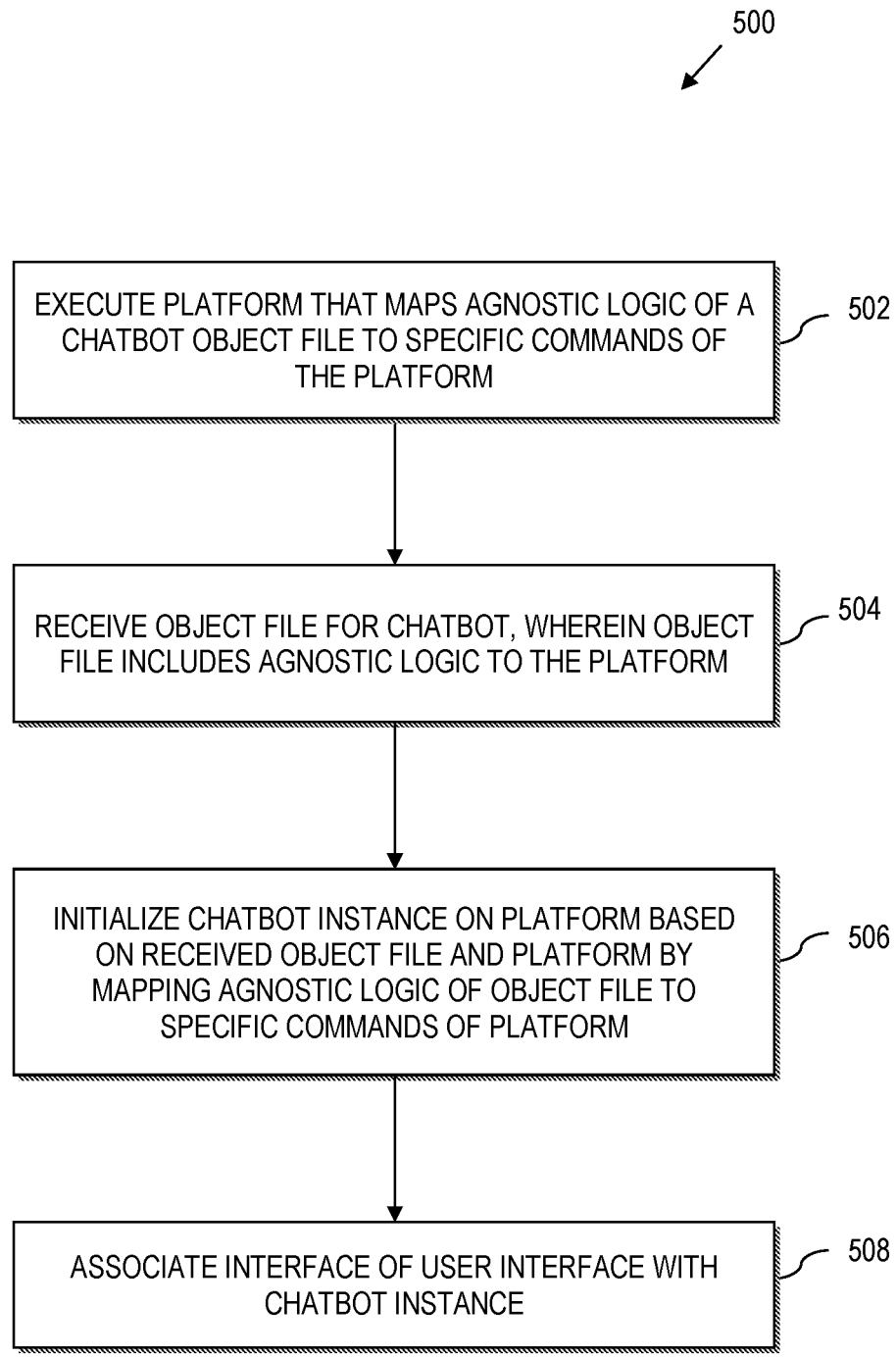
FIG. 5 is a flow chart illustrating a process for deploying a chatbot object file that is platform/framework agnostic, according to aspects of the present disclosure.

Referring now to FIG. 5, a process 500 for deploying a chatbot is presented. In this regard, the process 500 may be implemented on computer-readable hardware that stores machine-executable program code, where the program code instructs a processor to implement the described method. The process 500 may also be executed by a processor coupled to memory, where the processor is programmed by program code stored in the memory, to perform the described method. Further, the process 500 may be implemented as an application that runs on a deployment platform (e.g., Microsoft Bot Framework).

At 502, a platform that is capable of mapping agnostic logic of a chatbot object file to specific commands of the platform is executed. At 504, an object file for a chatbot (i.e., a chatbot object file) is received, and the chatbot object file includes logic that is agnostic to the platform. In other words, the chatbot object file has not been compiled specifically for the present platform. Thus, there may be commands and other logic within the object file that the platform cannot handle directly.

At 506, the platform initializes a chatbot instance on the platform based on the received object file and the platform itself by mapping the agnostic logic of the chatbot object file to specific commands of the platform. This mapping may take any desired form. For example, the chatbot instance may be placed inside a wrapper that translates the platform-specific commands to the platform-agnostic logic of the chatbot.

The chatbot instance is stateless, so when an update occurs, the chatbot instance may be stopped, updated, and restarted without a user of the chatbot noticing. Then, the updated instance of the chatbot responds to the user messages. Note that the updates do not need to go to the platform framework, as the application running on the platform framework takes care of creating the new instance of the chatbot from the updated chatbot object file.

The application on the deployment platform may also help handle specific situations regarding more than two entities involved in a conversation. For example, a user may wish to have a conversation with multiple chatbot instances (e.g., a human resources chatbot and a printer setup chatbot) at the same time. In such cases, then the messages sent to one chatbot are sent to the other chatbot. However, according to aspects of the present disclosure, the user may preface (or otherwise tag) a message to direct that message only to one of the chatbots. For example, if the two chatbots in the conversation with the user are HR_Chatbot and Printer_Chatbot, then the user may set up a whisper only to the HR_Chatbot with the following command (i.e., a whisper request): @HR_Chatbot message. Thus, only the HR_Chatbot will receive the message, while the message will be blocked from the Printer_Chatbot.

In another example, multiple users may wish to interact with a chatbot. For example, a husband and wife at two separate locations may wish to interact with a human resources chatbot about maternity leave. If the chatbot needs to send information to only one of the users (e.g., health information covered by HIPAA (Health Insurance Portability and Accountability Act) laws), then the chatbot may respond to only that user without the other user seeing the response. Further, the first user may use the same command (i.e., the whisper request) as above to ask the chatbot a question without the second user seeing. In some cases, the first user can request that the chatbot only respond to the first user such that the second user cannot see the response. Thus, multiple users can interact with multiple chatbots within the same conversation without divulging information to other users or sending irrelevant (i.e., off topic) messages to chatbots.

Further, the application may couple an interface to a messaging service to the chatbot instance such that a user can send messages to the chatbot instance. Moreover, the application may couple an interface to a natural language processor to the chatbot instance such that an intent of a message from the user may be derived outside of the chatbot instance. Thus, the chatbot developer does not need to create a custom language processor; however, in some embodiments, a custom language processor of the chatbot instance may be augmented with a natural language processor, as discussed above. Additionally, the application may couple an interface to a third-party backend to the chatbot instance such that the chatbot can refer to the third-party backend, as discussed above.

The deployment platform and framework described herein allows for only one chatbot object file that may be used on many different platform/frameworks, as long as there is a mapping to that framework. Thus, maintenance and updates to the chatbot object files is easier to implement than the present state of the art that requires a different object for each platform/framework.

Figure 6:
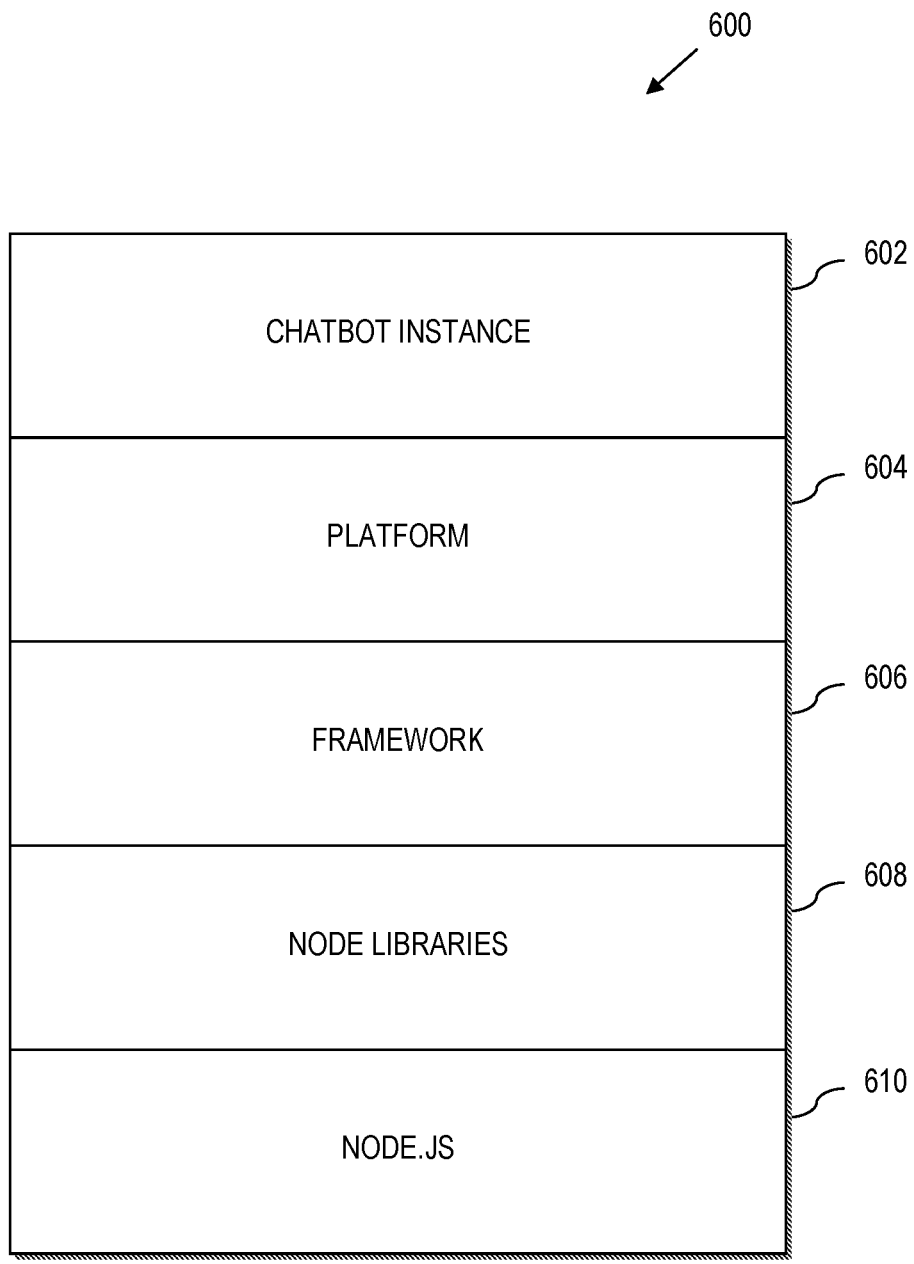
FIG. 6 is a block diagram of technology stack of a chatbot instance, according to aspects of the present disclosure.

FIG. 6 illustrates a technology stack 600 for a chatbot instance 602 according to aspects of the present disclosure. A platform 604 (i.e., a deployment platform) resides on top of a framework 606 that includes base libraries 608 including object files 610 for implementing the chatbot instance 602. When a chatbot instance is required, the application retrieves the object file and maps any platform/framework agnostic logic to logic supported by the platform and framework. Thus, even though the chatbot object files are platform and framework agnostic, the chatbot instances created from the chatbot object files are able to run on any framework (assuming a mapping is present). As discussed above, the mapping may simply be a wrapper that translates the platform-agnostic logic/interfaces to platform-specific logic/interfaces.

Miscellaneous

Figure 7:
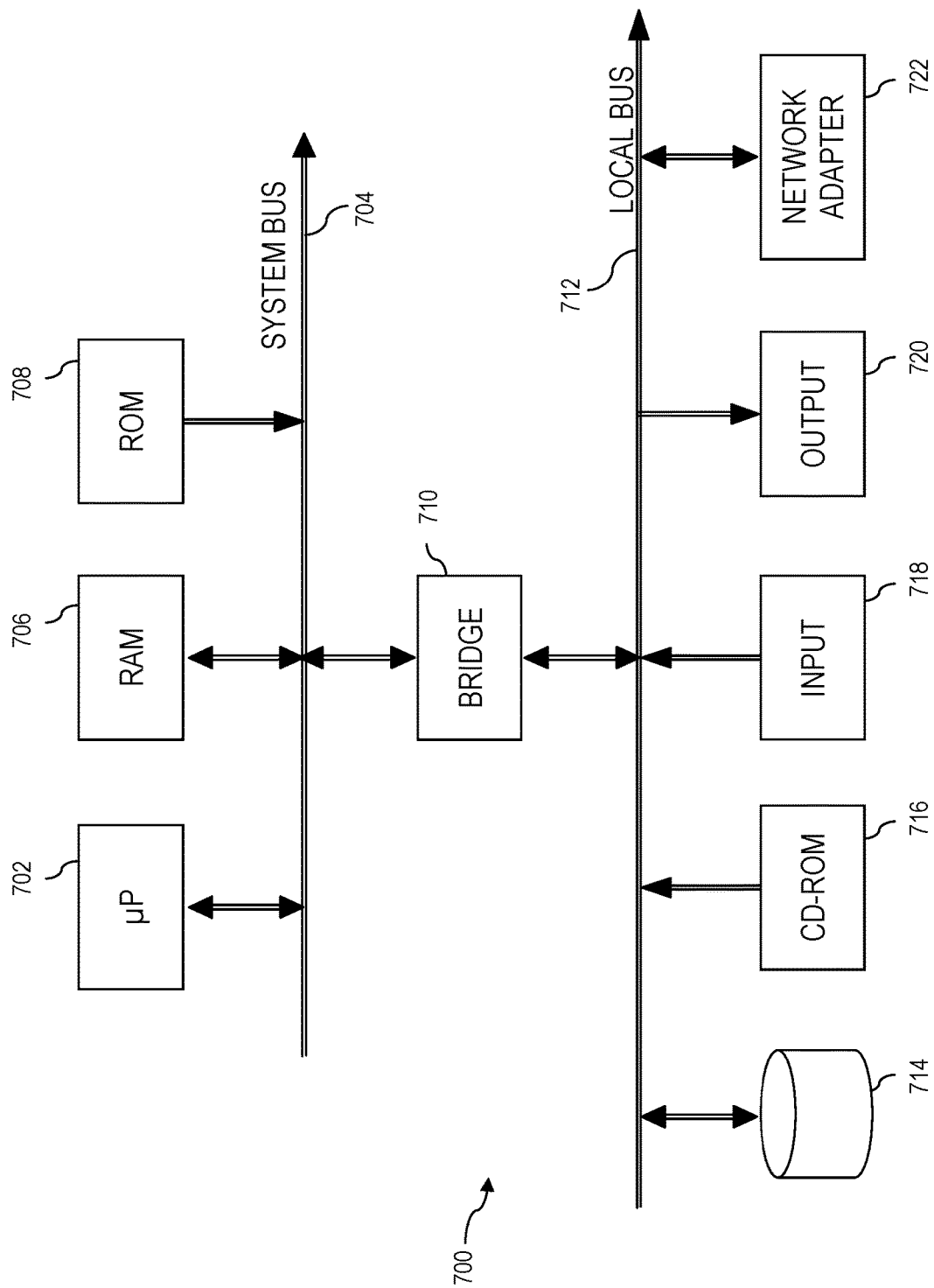
FIG. 7 is a block diagram of a computer system having a computer readable storage medium for implementing functions according to various aspects of the present invention as described in greater detail herein.

Referring to FIG. 7, a block diagram of a hardware data processing system is depicted in accordance with the present disclosure. Data processing system 1100 may comprise a symmetric multiprocessor (SMP) system or other configuration including a plurality of processors 702 connected to system bus 704. Alternatively, a single processor 702 may be employed. Also connected to the system bus 704 is local memory, e.g., RAM 706 and/or ROM 708. An I/O bus bridge 710 interfaces the system bus 704 to an I/O bus 712. The I/O bus 712 is utilized to support one or more buses and corresponding devices, such as storage 714, removable media storage 716, input devices 718, output devices 720, network adapters 722, other devices, combinations thereof, etc. For instance, a network adapter 722 can be used to enable the data processing system 700 to communicate with other data processing systems or remote printers or storage devices through intervening private or public networks.

The memory 706, 708, storage 714, removable media storage 716, or combinations thereof can be used to store program code that is executed by the processor(s) 702 to implement any aspect of the present disclosure described and illustrated in the preceding figures.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer storage medium does not include propagating signals.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Network using an Network Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A computer-implemented process for developing a chatbot, the process comprising:
    launching a graphical user interface implementing a drag and drop work environment for building chatbots;
    generating a user-created chatbot flow within the graphical user interface by:
        interacting with the graphical user interface for generating an initial node, the initial node defining a starting point in a conversation between an initiator and a corresponding chatbot; and
        interacting with the graphical user interface for generating a chat node, wherein the chat node links to the initial node, the chat node defining logic for processing a request from the initiator and for generating a response to the request based upon a topic associated with the user-created chatbot flow;
    creating a generic chatbot object file that, when instantiated on any desired deployment platform, deploys a chatbot instance by:
        interacting with the graphical user interface to generate the generic chatbot object file from the user-created chatbot flow, wherein the generic chatbot object file is generated by linking the user-created chatbot flow to at least one library of common chatbot code elements that are platform agnostic;
        wherein the generic chatbot object file contains platform agnostic logic and is free of platform specific executable code; and
        the platform agnostic logic of the generic chatbot object file maps to deployment platform-specific executable commands; and
    generating a chatbot instance by:
        reading the generic chatbot object file to identify the platform agnostic logic of the chatbot;
        translating the generic chatbot object file into the chatbot instance, the chatbot instance being platform dependent and associated with a selected platform, by linking the platform agnostic logic to platform-specific logic of the selected platform; and
        deploying the chatbot instance on the selected platform.

2. The computer-implemented process of claim 1 further comprising:
    defining, for a select one of the initial node and the chat node, a detail specification that defines actions to be performed before and/or after executing logic of the select one of the initial node and the chat node.

3. The computer-implemented process of claim 1 further comprising:
    defining, for a select one of the initial node and the chat node, a flow specification that defines logic executed by the select one of the initial node and the chat node based upon a predicted conversational intent of an initiator interacting with the chatbot instance.

4. The computer-implemented process of claim 1, wherein:
    creating a generic chatbot object file comprises:
        linking the user-created chatbot flow to at least one software connector; and
        saving the generic chatbot object file in a JavaScript Object Notation (JSON) file format.

5. The computer-implemented process of claim 1, wherein:
    linking the platform agnostic logic to platform-specific logic of the selected platform comprises linking the platform agnostic logic to at least one of node packages and a specific bot framework.

6. The computer-implemented process of claim 1 further comprising:
    initializing the chatbot instance deployed on the selected platform, wherein linking the platform agnostic logic to platform-specific logic of the selected platform is carried out by mapping the platform agnostic logic of the generic chatbot object file to corresponding specific commands of the platform; and associating an interface with the chatbot instance.

7. The computer-implemented process of claim 6 further comprising:
receiving an update to the generic chatbot object file;
implementing the update on the chatbot instance; and
initializing a new chatbot instance on the selected platform based on the update to the generic chatbot object file.

8. The computer-implemented process of claim 6 further comprising:
designating the chatbot instance as a first chatbot instance;
designating the interface associated with the first chatbot instance as a first interface;
initializing a second chatbot instance on the selected platform based on the generic chatbot object file; and
associating a second interface with the second chatbot instance, wherein the second interface is identical to the first interface.

9. The computer-implemented process of claim 8 further comprising:
initiating a conversation between the first chatbot instance, the second chatbot instance, and a user.

10. The computer-implemented process of claim 9 further comprising:
receiving a whisper request from the user in the conversation for a whisper communication to the first chatbot instance; and
passing the whisper request to the first chatbot instance.

11. The computer-implemented process of claim 6 further comprising:
initiating a conversation between the chatbot instance, a first user, and a second user.

12. The computer-implemented process of claim 11 further comprising:
receiving a whisper request from the first user or the second user in the conversation for a whisper communication to the chatbot instance; and
passing the whisper request to the chatbot instance.

13. The computer-implemented process of claim 6 further comprising:
associating an interface to a third-party back end associated with the chatbot instance.

14. The computer-implemented process of claim 6 further comprising:
associating an interface to a natural language processor associated with the chatbot instance.

15. A system for developing a chatbot, the system comprising:
a processor coupled to a memory comprising a program for developing a chatbot, wherein the program instructs the processor to perform:
launching a graphical user interface implementing a drag and drop work environment for building chatbots;
generating a user-created chatbot flow within the graphical user interface by:
interacting with the graphical user interface for generating an initial node, the initial node defining a starting point in a conversation between an initiator and a corresponding chatbot; and
interacting with the graphical user interface for generating a chat node, wherein the chat node links to the initial node, the chat node defining logic for processing a request from the initiator and for generating a response to the request based upon a topic associated with the user-created chatbot flow;
creating a generic chatbot object file that, when instantiated on any desired deployment platform, deploys a chatbot instance by:
interacting with the graphical user interface to generate the generic chatbot object file from the user-created chatbot flow, wherein the generic chatbot object file is generated by linking the user-created chatbot flow to at least one library of common chatbot code elements that are platform agnostic;
wherein the generic chatbot object file contains platform agnostic logic and is free of a platform specific executable code; and
the platform agnostic logic of the generic chatbot object file maps to deployment platform-specific executable commands; and
generating a chatbot instance by:
reading the generic chatbot object file to identify the platform agnostic logic of the chatbot;
translating the generic chatbot object file into the chatbot instance, the chatbot instance being platform dependent and associated with a selected platform, by linking the platform agnostic logic to platform-specific logic of the selected platform; and
deploying the chatbot instance on the selected platform.

16. The system of claim 15, wherein the program further instructs the processor to perform:
defining, for a select one of the initial node and the chat node, a detail specification that defines actions to be performed before and/or after executing logic of the select one of the initial node and the chat node.

17. The system of claim 15, wherein the program further instructs the processor to perform:
defining, for a select one of the initial node and the chat node, a flow specification that defines logic executed by the select one of the initial node and the chat node based upon a predicted conversational intent of an initiator interacting with the chatbot instance.

18. The system of claim 15, wherein:
creating a generic chatbot object file comprises:
linking the user-created chatbot flow to at least one software connector; and
saving the generic chatbot object file in a JavaScript Object Notation (JSON) file format.

19. The system of claim 15, wherein:
linking the platform agnostic logic to platform-specific logic of the selected platform comprises linking the platform agnostic logic to at least one of node packages and a specific bot framework.

20. The system of claim 15, wherein the program further instructs the processor to perform:
receiving an update to the generic chatbot object file;
implementing the update on the chatbot instance; and
initializing a new chatbot instance on the selected platform based on the update to the generic chatbot object file.

21. The system of claim 15, wherein the program further instructs the processor to perform:
designating the chatbot instance as a first chatbot instance;
designating the interface associated with the first chatbot instance as a first interface;
initializing a second chatbot instance on the selected platform based on the received generic chatbot object file; and associating a second interface with the second chatbot instance, wherein the second interface is identical to the first interface.

22. The system of claim 21, wherein the program further instructs the processor to perform:
initiating a conversation between the first chatbot instance, the second chatbot instance, and a user.

23. The system of claim 22, wherein the program further instructs the processor to perform:
receiving a whisper request from the user in the conversation for a whisper communication to the first chatbot instance; and
passing the whisper request to the first chatbot instance.

24. The system of claim 15, wherein the program further instructs the processor to perform:
initiating a conversation between the chatbot instance, a first user, and a second user.

25. The system of claim 24, wherein the program further instructs the processor to perform:
receiving a whisper request from the first user or the second user in the conversation for a whisper communication to the chatbot instance; and
passing the whisper request to the chatbot instance.

26. The system of claim 15, wherein the program further instructs the processor to perform:
associating an interface to a third-party back end associated with the chatbot instance.

27. The system of claim 15, wherein the program further instructs the processor to perform:
associating an interface to a natural language processor associated with the chatbot instance.

* * * * *